US009229909B1

(12) United States Patent
Perry

(10) Patent No.: US 9,229,909 B1
(45) Date of Patent: Jan. 5, 2016

(54) METHOD AND APPARATUS FOR PERFORMING REQUIREMENT-DRIVEN DISCRETE FOURIER TRANSFORMS AND THEIR INVERSES

(71) Applicant: Altera Corporation, San Jose, CA (US)

(72) Inventor: Steven Perry, High Wycombe (GB)

(73) Assignee: Altera Corporation, San Jose, CA (US)

( * ) Notice: Subject to any disclaimer, the term of this patent is extended or adjusted under 35 U.S.C. 154(b) by 488 days.

(21) Appl. No.: 13/667,345

(22) Filed: Nov. 2, 2012

(51) Int. Cl.
*G06F 17/14* (2006.01)

(52) U.S. Cl.
CPC .................................. *G06F 17/141* (2013.01)

(58) Field of Classification Search
CPC ... G06F 17/141; G06F 17/142; G06F 17/143; G06F 9/30014; G06F 9/30036; G06F 17/14; G06F 17/10; G06G 7/1921; G01R 23/00
USPC ................................................... 708/405, 409
See application file for complete search history.

(56) References Cited

U.S. PATENT DOCUMENTS

2003/0225805 A1* 12/2003 Nash ............................. 708/403

\* cited by examiner

*Primary Examiner* — Tan V. Mai
(74) *Attorney, Agent, or Firm* — L. Cho

(57) ABSTRACT

A method for designing a discrete Fourier transform (DFT) unit in a system on a target device includes identifying a number of DFT engines to implement in the DFT unit in response to a data throughput rate, a clock rate of the system, a size of a DFT, and radix of each of the DFT engines.

27 Claims, 15 Drawing Sheets

$W_b = R_b + jI_b \quad W_c = R_c + jI_c \quad W_d = R_d + jI_d$
$x'_a = x_a + x_b + x_c + x_d$
$y'_a = y_a + y_b + y_c + y_d$
$x'_b = (x_a + y_b - x_c - y_d)R_b - (y_a - x_b - y_c + x_d)I_b$
$y'_b = (y_a - x_b - y_c + x_d)R_b + (x_a + y_b - x_c - y_d)I_b$
$x'_c = (x_a - x_b + x_c - x_d)R_c - (y_a - y_b + y_c - y_d)I_c$
$y'_c = (y_a - y_b + y_c - y_d)R_c + (x_a - x_b + x_c - x_d)I_c$
$x'_d = (x_a - y_b - x_c + y_d)R_d - (y_a + x_b - y_c - x_d)I_d$
$y'_d = (y_a + x_b - y_c - x_d)R_d + (x_a - y_b - x_c + y_d)I_d$

METHOD AND APPARATUS FOR PERFORMING REQUIREMENT-DRIVEN DISCRETE FOURIER TRANSFORMS AND THEIR INVERSES

FIELD

Embodiments of the present invention relate to tools for designing systems on target devices. More specifically, embodiments of the present invention relate to a method and apparatus for performing requirement-driven discrete Fourier transforms and their inverses.

BACKGROUND

In mathematics, a discrete Fourier transform (DFT) transforms one function from a time domain representation to a frequency domain representation. The DFT requires an input function that is discrete. Such inputs are often created by sampling a continuous function, such as an amplitude of a sound over time. The discrete input function must have a limited duration, such as one period of a periodic sequence or a windowed segment of a longer sequence. The input to the DFT is a finite sequence of real or complex numbers, making the DFT ideal for processing information stored in computers. In particular, the DFT is widely employed in signal processing and related fields to analyze the frequencies contained in a sampled signal to solve partial differential equations, and to perform other operations such as convolutions or multiplying large integers. A key enabling factor for these applications is the fact that the DFT can be computed efficiently in practice using a fast Fourier transform (FFT) algorithm.

Target devices such as field programmable gate arrays (FPGAs), structured application specific integrated circuits (ASICs), and ASICs are used to implement large systems that may include million of gates and megabits of embedded memory. The target devices often have resources available to create DFT engines to perform DFT operations. When designing a system on the target device, a designer is limited by the tools of an electronic design automation (EDA) tool and do not have an option for parameterization of DFT engines. In order to scale performance, the designer is required to design a DFT unit manually and use trial and error to determine whether sufficient throughput exists and whether resources on the target device have been efficiently allocated. This phase of the design often required additional time and resources.

SUMMARY

According to embodiments of the present invention, a method and apparatus for performing requirement-driven discrete Fourier transforms are disclosed. A required performance point may be specified for a generator to design and build the hardware needed to implement a DFT unit to compute DFTs according to satisfy the performance point. DFT calculations are treated as a graph of butterfly calculations. The logical butterflies are folded onto fewer physical butterflies to achieve resource savings.

According to an embodiment of the present invention, a method for designing a DFT unit in a system on a target device includes identifying a number of DFT engines to implement in the DFT unit in response to a data throughput rate, a clock rate of the system, a size of the DFT, and radix of each of the DFT engines. Each of the DFT engines may be used to perform one or more logical butterflies.

According to an embodiment of the present invention, a method for designing a DFT unit in a system on a target device includes building a tessellated DFT unit in response to determining that a data throughput rate divided by a product of a clock rate of the system and the radix of each of the DFT engines is a non-integer number. According to an aspect of the invention, during a point of time of operation, DFT engines in the tessellated DFT unit may be used to perform computations at different stages of a DFT.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, procedures, and programs are shown in block diagram form to avoid obscuring embodiments of the present invention unnecessarily.

Figure 1:
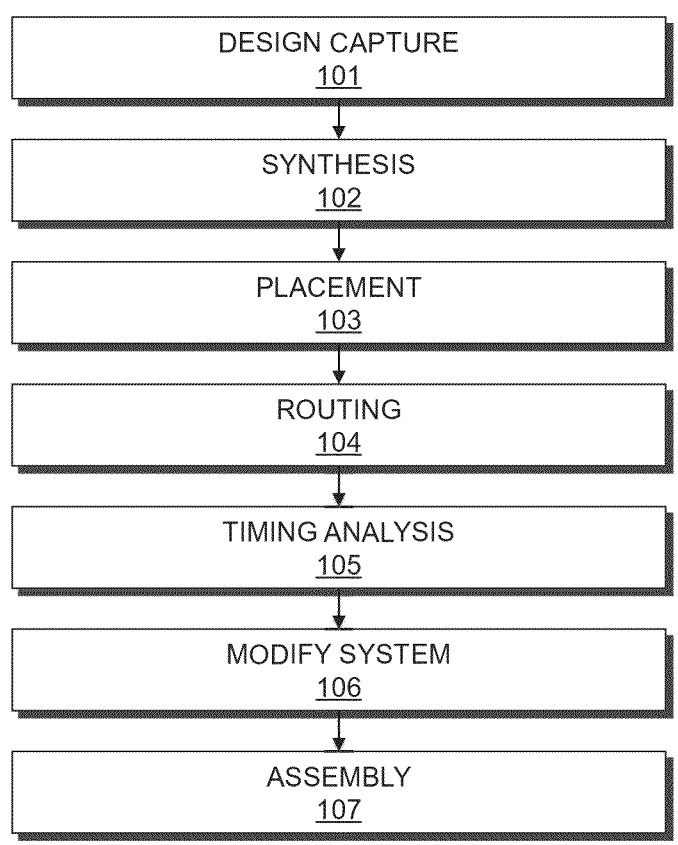
FIG. 1 is a flow chart illustrating a method for designing a system on a target device according to an exemplary embodiment of the present invention.

FIG. 1 is a flow chart illustrating a method for designing a system on a target device according to an exemplary embodiment of the present invention. The target device may be a field programmable gate array (FPGA), application specific integrated circuit (ASIC), a structured ASIC, or other programmable device. According to one embodiment, the procedure illustrated in FIG. 1 may be performed by a computer aided design (CAD)/electronic design automation (EDA) tool implemented on a computer system. At 101, a description of a system is generated in a design capture procedure. According to an embodiment of the present invention, a hardware description language (HDL) design definition is generated to describe the system. The HDL is generated in response to specifications of the system provided by a designer. The specifications may be provided through a design entry tool. The specifications may describe components and interconnections in the system. According to an embodiment of the present invention, a design for a discrete Fourier transform (DFT) unit is generated during the design capture procedure. The design is generated using desired throughput (sample rate) as a parameter to accurately build a streaming DFT unit. The DFT unit is designed with the objective of not overusing resources to achieve the desired throughput.

At 102, the system is synthesized. Synthesis includes generating a logic design of the system to be implemented by the target device. According to an embodiment of the present invention, synthesis generates an optimized logical representation of the system from the HDL design definition. Synthesis also includes mapping the optimized logic design. Mapping includes determining how to implement logic gates and logic elements in the optimized logic representation with specific resources on the target device. According to an embodiment of the present invention, a netlist is generated from mapping. This netlist may be an optimized technology-mapped netlist generated from the HDL.

At 103, the system is placed. According to an embodiment of the present invention, placement involves placing the mapped logical system design on the target device. Placement works on the technology-mapped netlist to produce a placement for each of the functional blocks. According to an embodiment of the present invention, placement includes fitting the system on the target device by determining which resources on the logic device are to be used for specific logic elements, and other function blocks, determined to implement the system during synthesis. Placement may include clustering which involves grouping logic elements together to form the logic clusters present on the target device. According to an embodiment of the present invention, clustering is performed at an early stage of placement and occurs directly after synthesis during the placement preparation stage.

At 104, the placed design is routed. During routing, routing resources on the target device are allocated to provide interconnections between logic gates, logic elements, and other components on the target device. Routability optimization may also be performed on the placed logic design. According to an embodiment of the present invention, the goal of routability optimization is to reduce the amount of wiring used to connect components in the placed logic design. Routability optimization may include performing fanout splitting, logic duplication, logical rewiring, or other procedures. It should be appreciated that one or more of the procedures may be performed on the placed logic design.

At 105, timing analysis is performed on the system designed by procedures 101-104. According to an embodiment of the present invention, the timing analysis determines whether timing constraints of the system are satisfied.

At 106, the design for the system is modified in response to the timing analysis. According to an embodiment of the present invention, the design for the system may be modified in response to determining that timing constraints have not been satisfied. The design for the system may be modified by a designer manually or alternatively the design may be modified automatically by the EDA tool by re-executing one or more of procedures 102-104. It should also be appreciated that each procedure may perform this optimization in its first invocation by performing the analysis during its execution.

At 107, an assembly procedure is performed. The assembly procedure involves creating a data file that includes information determined by the procedures described at 101-106. The data file may be a bit stream that may be used to program a target device. According to an embodiment of the present invention, the procedures illustrated in FIG. 1 may be performed by an EDA tool executed on a first computer system. The data file generated may be transmitted to a second computer system to allow the design of the system to be further processed. Alternatively, the data file may be transmitted to a second computer system which may be used to program the target device according to the system design. It should be appreciated that the design of the system may also be output in other forms such as on a display device or other medium. The target device may be programmed with the data file. By programming the target with the data file, components on the target device are physically transformed to implement the system.

Figure 2A:
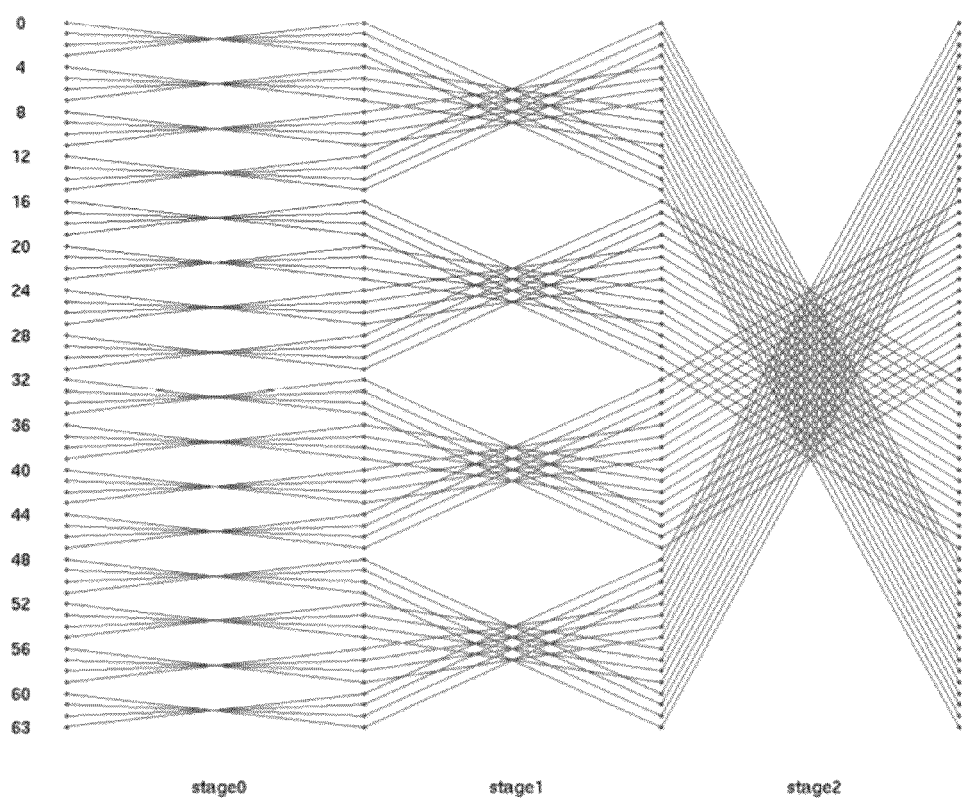
FIG. 2A illustrates an example of a signal flow graph of a discrete Fourier transform that may be processed by an embodiment of the present invention and FIG. 2B illustrates a general structure of a radix 4 butterfly.

FIG. 2A illustrates an example of a signal flow graph of a DFT that may be processed by an embodiment of the present invention. An N-point DFT is defined by the following relationship.

$$X(k) = \sum_{n=0}^{N-1} x(n) W_k^{nk} \quad k = 0, 1, \ldots, N-1. \quad W_N^{nk} = e^{-i2\pi nk/N}$$

The N-point DFT can be decomposed to repeated micro-operations called butterfly operations. When the size of the butterfly is R, the DFT operation is called a radix-R DFT. For DFT hardware realization, if only one physical butterfly structure (DFT engine) is implemented, this DFT engine will execute all calculations iteratively. If parallel and pipeline processing techniques are used, an N point radix-R DFT can be executed by (N/R) log$_R$N clock cycles. This indicates that a radix 4 DFT can be four times faster than a radix 2 DFT.

FIG. 2A illustrates a flow graph of a DFT having a length of 64 points as illustrated by points 0-63 on the left side of the drawing. In this example, the 64 points are processed in three stages labeled stage0-stage2. The DFT is radix 4, where 4 points or 4 data results are processed together at each stage. The convergence of 4 data lines to a point at each stage represent the point of processing of the data. This may be referred to as a logical butterfly, where a butterfly operation is performed. As shown in this example, 16 logical butterflies are present in each of the stages, stage 0, stage 1, and stage 2.

Figure 2B:
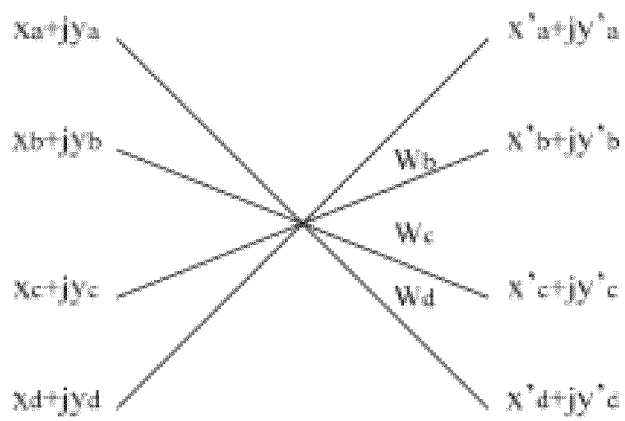

FIG. 2B illustrates the general structure of a radix 4 butterfly (logical butterfly).

Figure 3:
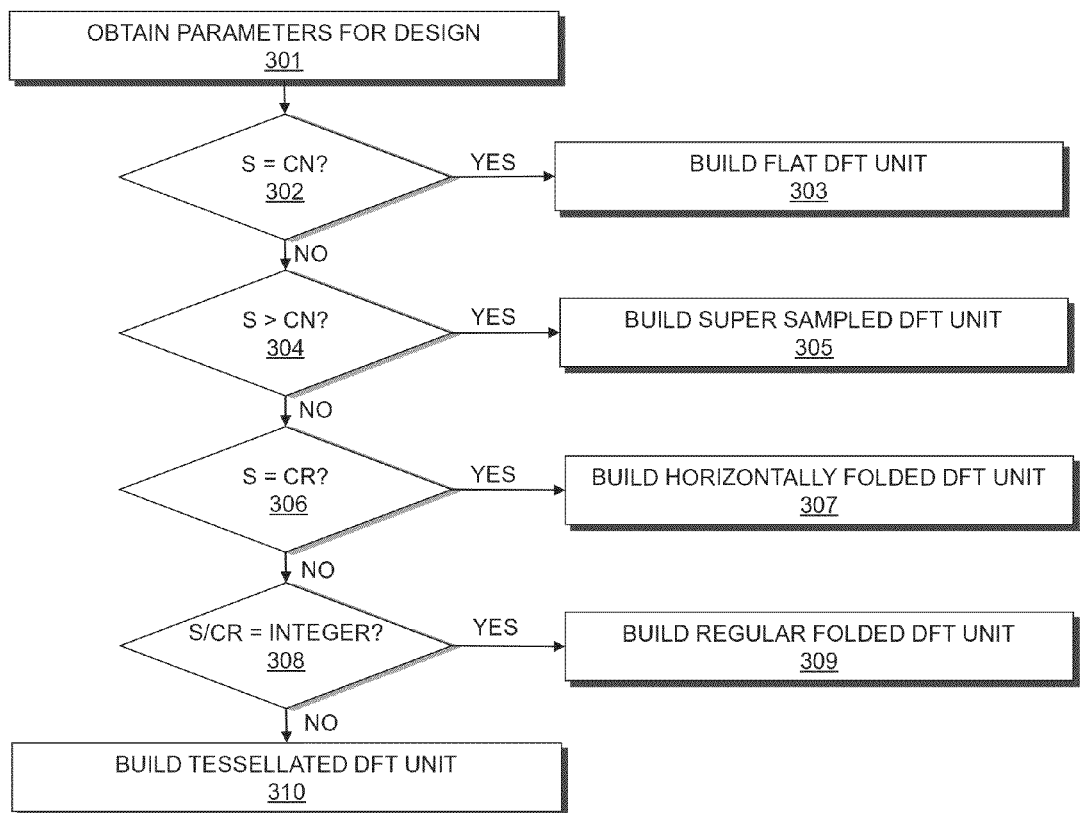
FIG. 3 is a flow chart illustrating a method for determining a type of DFT unit to design according to an embodiment of the present invention.

FIG. 3 is a flow chart illustrating a method for determining a type of DFT unit to design according to an embodiment of the present invention. The DFT unit may be used to perform the computations of a DFT such as that illustrated in FIG. 2A. According to an embodiment of the present invention, the procedure illustrated in FIG. 3 may be performed at 101 in FIG. 1. At 301, parameters for a DFT unit are obtained. The parameters obtained include a desired throughput or data rate (S), a clock rate (C), a radix of DFT engines to be implemented by the DFT unit (R), and a length of the DFT (N). The desired throughput rate describes how fast data to be processed is to be transmitted to the DFT unit and how fast data to be processed is to be output from the DFT unit. The clock rate describes the speed in which components on the DFT unit are operating at as clocked by the system. The radix of the DFT engines specify a number of data that are processed at each logical butterfly or a number of data each DFT engine can process at a time. The length of the DFT describes how many points of data are being processed by the DFT unit. It should be appreciated that the parameters for the DFT unit may be obtained by design specification for the system, directly from user input, or by other procedures. It should be appreciated that all DFT engines need not be the same radix to facilitate building mixed radix transforms.

At 302, it is determined whether the throughput rate is equal to the clock rate multiplied by the length of the DFT. If the throughput rate is equal to the clock rate multiplied by the length of the DFT, control proceeds to 303. If the throughput rate is not equal to the clock rate multiplied by the length of the DFT, control proceeds to 304.

At 303, a flat DFT unit is built. According to an embodiment of the present invention, a flat DFT unit implements a separate DFT engine for each logical butterfly in a DFT. This allows all of the logical butterflies to perform a butterfly operation at the same time in a pipeline.

At 304, it is determined whether the throughput rate is greater than the clock rate multiplied by the length of the DFT. If the throughput rate is greater than the clock rate multiplied by the length of the DFT, control proceeds to 305. If the throughput rate is greater than the clock rate multiplied by the length of the DFT, control proceeds to 306.

At 305, a super sampled DFT unit is built. According to an embodiment of the present invention, a super sampled DFT unit implements more than one DFT engine in parallel to provide a higher data throughput than achievable in a single flat DFT unit.

At 306, it is determined whether the throughput rate is equal to the clock rate multiplied by the radix of each of the DFT engines. If the throughput rate is equal to the clock rate multiplied by the radix of each of the DFT engines, control proceeds to 307. If the throughput rate is not equal to the clock rate multiplied by the radix of each of the DFT engines, control proceeds to 308.

At 307, a horizontally folded DFT unit is built. According to an embodiment of the present invention, a horizontally folded DFT unit implements a single DFT engine for the logical butterflies in a stage of a DFT. Each stage of the DFT will implement one DFT engine and memories will shuffle data.

At 308, it is determined whether the throughput rate divided by the product of the clock rate and the radix of each of the DFT engines is an integer number. If the throughput rate divided by the product of the clock rate and the radix of each of the DFT engines is an integer number, control proceeds to 309. If the throughput rate divided by the product of the clock rate and the radix of each of the DFT engines is not an integer number, control proceeds to 310.

At 309, a regular folded DFT unit is built. According to an embodiment of the present invention, a regular folded DFT unit implements a plurality of DFT engines for the logical butterflies in each stage of a DFT. Each stage of the DFT will implement a plurality of DFT engines. However, the number of the plurality of DFT engines would be less than N/R and memories will be used to shuffle data.

At 310, a tessellated DFT unit is built. According to an embodiment of the present invention, a tessellated DFT unit implements one or more DFT engines for the logical butterflies for each stage of a DFT. In a tessellated DFT unit, a different number of DFT engines may be implemented for different stages of the DFT. This allows for the DFT engines to perform computations at different stages of a DFT during a point of time.

Figure 4:
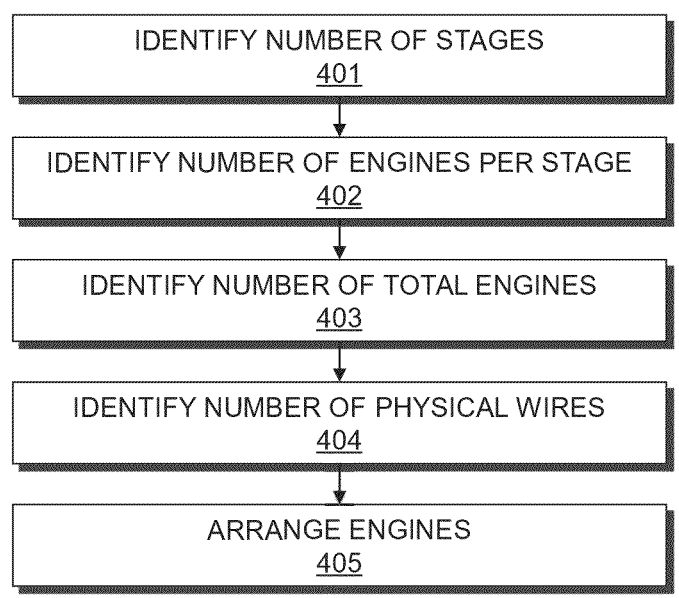
FIG. 4 is a flow chart illustrating a method for designing a DFT unit in a system on a target device according to an embodiment of the present invention.

FIG. 4 is a flow chart illustrating a method for designing a DFT unit in a system on a target device according to an embodiment of the present invention. The procedure illustrated in FIG. 4 may be implemented at 303, 305, 307 309, or 310 in FIG. 3 while building a DFT unit. At 401, a number of stages is identified for a DFT to be computed. The number of stages of the DFT may also be referred to as a number of layers of butterflies. According to an embodiment of the present invention, the number of stages is identified based on a radix of DFT engines used in the DFT unit and the DFT length. The number of stages may be computed using the following relationship.

$$\text{Number of Stages} = \log_R(N)$$

At 402, a number of DFT engines per stage is identified. The number of DFT engines per stage may also be referred to as a number of physical butterflies per layer. It should be appreciated that for flat DFT units, super sampled DFT units, horizontally folded DFT units, and regular folded DFT units, the number of DFT engines per stage may be the same for each stage of the DFT, and be an integer number. However, for tessellated DFT units, the actual number of DFT engines per stage may very per stage. According to an embodiment of the present invention, the number of DFT engines per stage is identified based on the throughput rate, the clock rate of the system, and the radix of DFT engines used in the DFT unit. The number of DFT engines per stage may be computed using the following relationship.

$$\text{Number of DFT Engines/Stage} = S/(C*R)$$

At 403, a number of total DFT engines to be implemented for the DFT unit is identified. The number of total DFT engines to be implemented for the DFT unit may also be referred to as a total number of physical butterflies implemented for the DFT unit. According to an embodiment of the present invention, the number of total DFT engines to be implemented for the DFT unit may be based on the number of stages of the DFT unit and the number of DFT engines per stage. The number of total DFT engines to be implemented for the DFT unit may be computed using the following relationship.

$$\text{Number of Total DFT Engines} = \log_R(N)*S/(C*R)$$

At 404, a number of physical wires to input into the DFT unit is identified. According to an embodiment of the present invention, the number of physical wires to input into the DFT unit is identified based on the throughput rate and the clock rate. The number of physical wires to input into the DFT unit may be computed using the following relationship.

$$\text{Number of Physical Wires} = \text{Ceil}(S/C)$$

Figure 8A:
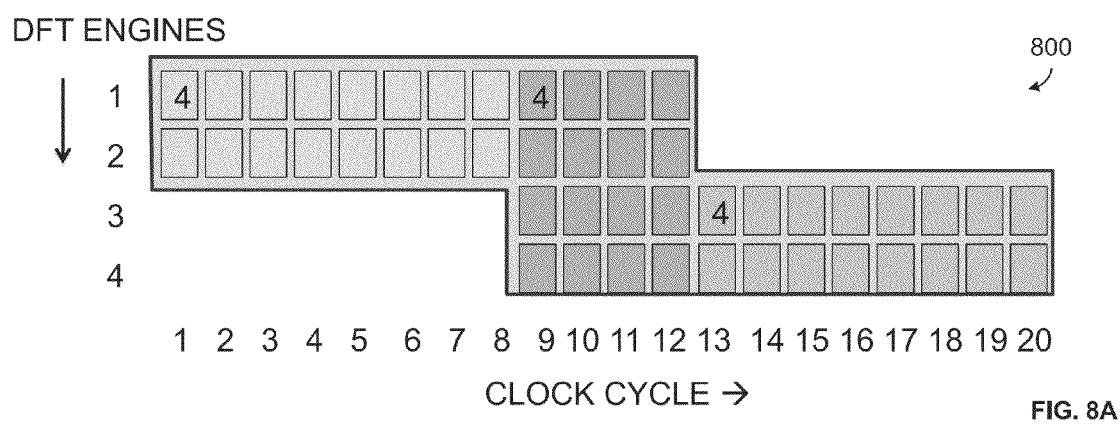
FIG. 8A illustrates a tessellated DFT unit according to an embodiment of the present invention and FIG. 8B illustrates a plurality of DFT engines used together.
Figure 8B:

At 405, the DFT engines are arranged. According to an embodiment of the present invention, arranging the DFT engines includes assigning the DFT engines to stages of the DFT. For flat, super sampled, horizontally folded, and regular folded DFT units, the number of DFT engines are distributed equally among stages of the DFT for computation purposes. For tessellated DFT units, a different procedure is used to distribute the DFT engines. FIGS. 8A-8B illustrates an exemplary method.

It should be appreciate that in addition to assigning the DFT engines to stages of the DFT, routing of the DFT engines within the DFT unit may also be performed. According to an embodiment of the present invention, data from DFT engines are input to memories with 1 read port and 1 write port. The R values output from each DFT engine is read in a different order. Inputs in a same input cycle are written to different memories. Outputs in a same output cycle are written to different memories.

Figure 5:
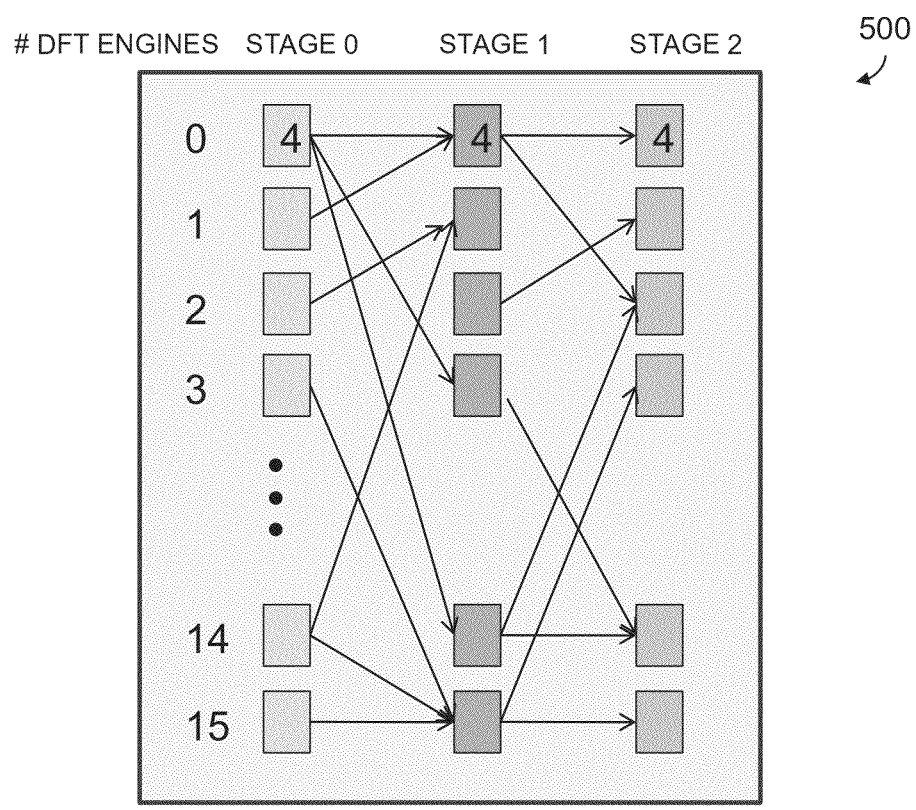
FIG. 5 illustrates a flat DFT unit according to an embodiment of the present invention.

FIG. 5 illustrates a flat DFT unit 500 according to an embodiment of the present invention. The flat DFT unit 500 may be created using the procedures described in FIGS. 3 and 4. In this example, the desired throughput (S) is 6400 mega samples/sec. The clock rate (C) is 100 MHz. The radix (R) of DFT engines to be implemented by the DFT unit is 4. The length of the DFT (N) is 64 samples. Referring to 302 and 303 of FIG. 3, since S=6400 mega samples/sec and C*N is also 6400 mega samples/sec, a flat DFT unit is to be built.

Referring to FIG. 4, at 401, a number of stages identified for a DFT may be computed with the relationship, $\log_R(N)$. The result for a radix 4 and DFT length of 64 is 3 stages.

At 402, a number of DFT engines per stage may be computed using the relationship S/(C*R). The result for a throughput of 6400 mega samples/sec, clock rate of 100 MHz, and radix 4 is 16.

At 403, a number of total DFT engines to be implemented for the DFT unit may be computed using the relationship $\log_R(N)$*S/(C*R). The result for a DFT of length 64 samples, a throughput of 6400 mega samples/sec, a clock rate of 100 MHz, and radix 4 is 48.

At 404, a number of physical wires to input into the DFT unit may be identified using the relationship Ceil(S/C). The result for a throughput of 6400 mega samples/sec and a clock rate of 100 MHz is 64 samples which translates to 64 wires.

At 405, the DFT engines are arranged. According to an embodiment of the present invention, arranging the DFT engines includes assigning the DFT engines to stages of the DFT. For flat DFT units, the number of DFT engines are distributed equally among stages of the DFT for computation purposes.

As shown in FIG. 5, flat DFT unit 500 includes 3 stages, labeled stage 0, stage 1, and stage 2. There are 16 DFT engines at each of the three stages, where the 16 DFT engines are lined up as columns. Each of the DFT engines is configured to receive 4 inputs from 4 different wires, and to perform a butterfly operation on the data from the 4 wires. The wires route or shuffle the data to the appropriate DFT engine for computation at a next stage. The flat DFT unit 500 implements a separate DFT engine for each logical butterfly in a DFT. This allows all of the logical butterflies to perform a butterfly operation at the same time.

Figure 6:
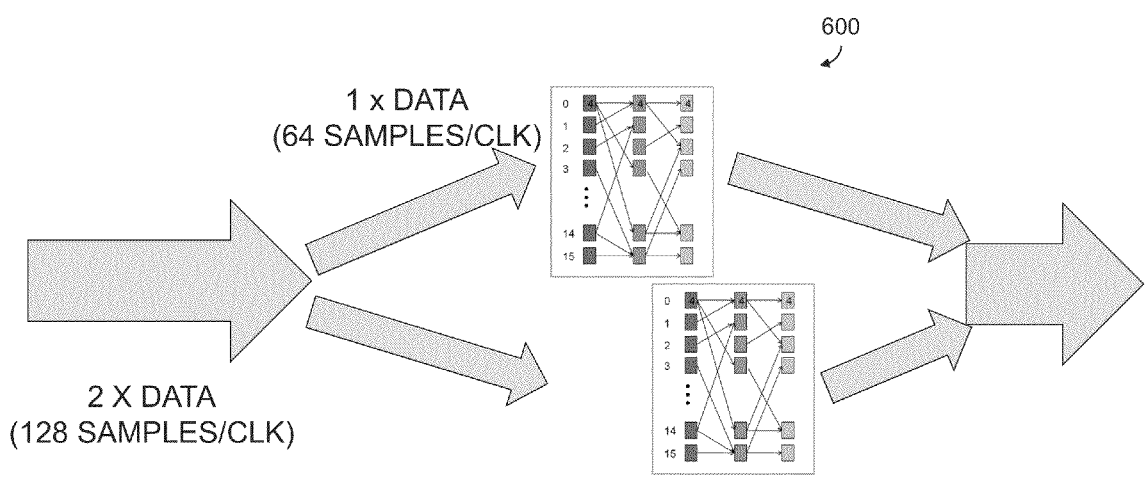
FIG. 6 illustrates a super sampled DFT unit according to an embodiment of the present invention.

FIG. 6 illustrates a super sampled DFT unit 600 according to an embodiment of the present invention. The super sampled DFT unit 600 may be created using the procedures described in FIGS. 3 and 4. In this example, the desired throughput (S) is 12,800 mega samples/sec. The clock rate (C) is 100 MHz. The radix (R) of DFT engines to be implemented by the DFT unit is 4. The length of the DFT (N) is 64 samples. Referring to 304 and 305 of FIG. 3, since S=12,800 mega samples/sec and C*N is 6400 mega samples/sec, a super sampled DFT unit is to be built.

Referring to FIG. 4, at 401, a number of stages identified for a DFT may be computed with the relationship, $\log_R(N)$. The result for a radix 4 and DFT length of 64 is 3 stages.

At 402, a number of DFT engines per stage may be computed using the relationship S/(C*R). The result for a throughput of 12,800 mega samples/sec, clock rate of 100 MHz, and radix 4 is 32.

At 403, a number of total DFT engines to be implemented for the DFT unit may be computed using the relationship $\log_R(N)$*S/(C*R). The result for a DFT of length 64 samples, a throughput of 12,800 mega samples/sec, a clock rate of 100 MHz, and radix 4 is 96.

At 404, a number of physical wires to input into the DFT unit may be identified using the relationship Ceil(S/C). The result for a throughput of 12,800 mega samples/sec and a clock rate of 100 MHz is 64 samples which translates to 128 wires.

At 405, the DFT engines are arranged. According to an embodiment of the present invention, arranging the DFT engines includes assigning the DFT engines to stages of the DFT. For super sampled DFT units, the number of DFT engines are distributed equally among stages of the DFT for computation purposes.

As shown in FIG. 6, with the throughput rate for this second example being twice that of the example in FIG. 5, super sampled DFT unit 600 may be implemented using two of the flat DFT units illustrated in FIG. 5. Two flat DFT units may be run in parallel with half of the data stream transmitted to each of the flat DFT units. After the data is processed by each of the flat DFT units, the data is recombined. With the configuration illustrated in FIG. 6, there are 32 DFT engines at each of the three stages. Each of the DFT engines is configured to receive 4 inputs from 4 different wires, and to perform a butterfly operation on the data from the 4 wires. The wires route or shuffle the data to the appropriate DFT engine for computation at a next stage. The super sampled DFT unit 600 implements a separate DFT engine for each logical butterfly in a DFT. This allows all of the logical butterflies to perform a butterfly operation at the same time.

Figure 7:
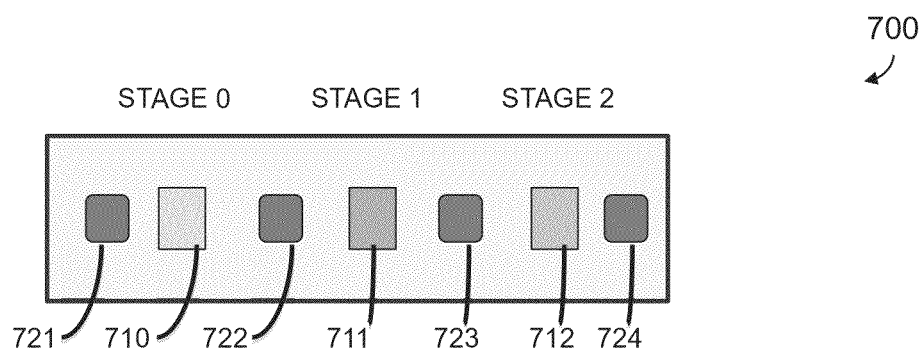
FIG. 7 illustrates a horizontally folded DFT unit according to an embodiment of the present invention.

FIG. 7 illustrates a horizontally folded DFT unit 700 according to an embodiment of the present invention. The horizontally folded DFT unit 700 may be created using the procedures described in FIGS. 3 and 4. In this example, the desired throughput (S) is 200 mega samples/sec. The clock rate (C) is 100 MHz. The radix (R) of DFT engines to be implemented by the DFT unit is 4. The length of the DFT (N) is 64 samples. Referring to 306 and 307 of FIG. 3, since S=200 mega samples/sec and C*R is also 400 mega samples/sec, a horizontally folded DFT unit is to be built.

Referring to FIG. 4, at 401, a number of stages identified for a DFT may be computed with the relationship, $\log_R(N)$. The result for a radix 4 and DFT length of 64 is 3 stages.

At 402, a number of DFT engines per stage may be computed using the relationship S/(C*R). The result for a throughput of 400 mega samples/sec, clock rate of 100 MHz, and radix 4 is 1.

At 403, a number of total DFT engines to be implemented for the DFT unit may be computed using the relationship $\log_R(N)$*S/(C*R). The result for a DFT of length 64 samples, a throughput of 200 mega samples/sec, a clock rate of 100 MHz, and radix 4 is 3.

At 404, a number of physical wires to input into the DFT unit may be identified using the relationship Ceil(S/C). The result for a throughput of 400 mega samples/sec and a clock rate of 100 MHz is 4 samples which translates to 4 wires.

At 405, the DFT engines are arranged. According to an embodiment of the present invention, arranging the DFT engines includes assigning the DFT engines to stages of the DFT. For horizontally folded DFT units, the number of DFT engines are distributed equally among stages of the DFT for computation purposes.

As shown in FIG. 7, horizontally folded DFT unit 700 includes 3 stages, labeled stage 0, stage 1, and stage 2. There is one DFT engine at each of the three stages. DFT engine 710 is used to compute butterfly operations (perform a logical butterfly) at stage 0. DFT engine 711 is used to compute butterfly operations at stage 1. DFT engine 712 is used to compute butterfly operations at stage 2. Each of the DFT units is configured to receive 4 inputs from 4 different wires, and to perform a butterfly operation on the data from the 4 wires. Memory units 721-724 operate to buffer and shuffle data into and out of the DFT engines 710-712.

Regular folded DFT units may be built when S is not equal to C times R, and S/CR is an integer number. A regular folded DFT unit may be configured similarly to a horizontally folded DFT unit with the difference being that instead of having a single DFT engine implement at each stage to compute butterfly operations, a plurality of DFT engines may be implemented at each stage to compute butterfly operations, wherein the plurality of DFT engines is less than N/R. As with the horizontally folded DFT unit, memory units are used to buffer and shuffle data between the DFT engines of each stage.

FIG. 8A illustrates a tessellated DFT unit 800 according to an embodiment of the present invention. Unlike FIGS. 5-7 which illustrate the physical implementation of DFT engines where each block represents a DFT engine, FIG. 8A illustrates how each of the DFT engines in the tessellated DFT unit 800 are implemented over time in the processing of a DFT. In this example, the tessellated DFT unit 800 may be created using the procedures described in FIGS. 3 and 4. In this example, the desired throughput (S) is 533 mega samples/sec. The clock rate (C) is 100 MHz. The radix (R) of DFT engines to be implemented by the DFT unit is 4. The length of the DFT (N) is 64 samples. Referring to 308 and 310 of FIG. 3, since S=533 mega samples/sec and C*R is also 400 mega samples/sec, a tessellated DFT unit is to be built.

Referring to FIG. 4, at 401, a number of stages identified for a DFT may be computed with the relationship, $\log_R(N)$. The result for a radix 4 and DFT length of 64 is 3 stages.

At 402, a number of DFT engines per stage may be computed using the relationship S/(C*R). The result for a throughput of 533 mega samples/sec, clock rate of 100 MHz, and radix 4 is 1.333. This is non-integer number. This indicates that the number of DFT engines allocated for the stages of the DFT are not equal.

At 403, a number of total DFT engines to be implemented for the DFT unit may be computed using the relationship $\log_R(N)*S/(C*R)$. The result for a DFT of length 64 samples, a throughput of 533 mega samples/sec, a clock rate of 100 MHz, and radix 4 is 4.

At 404, a number of physical wires to input into the DFT unit may be identified using the relationship Ceil(S/C). The result for a throughput of 533 mega samples/sec and a clock rate of 100 MHz is 6 samples which translates to 6 wires.

At 405, the DFT engines are arranged. According to an embodiment of the present invention, the methodology of FIG. 9 may be used to arrange the DFT engines in the tessellated DFT unit 800.

Figure 9:
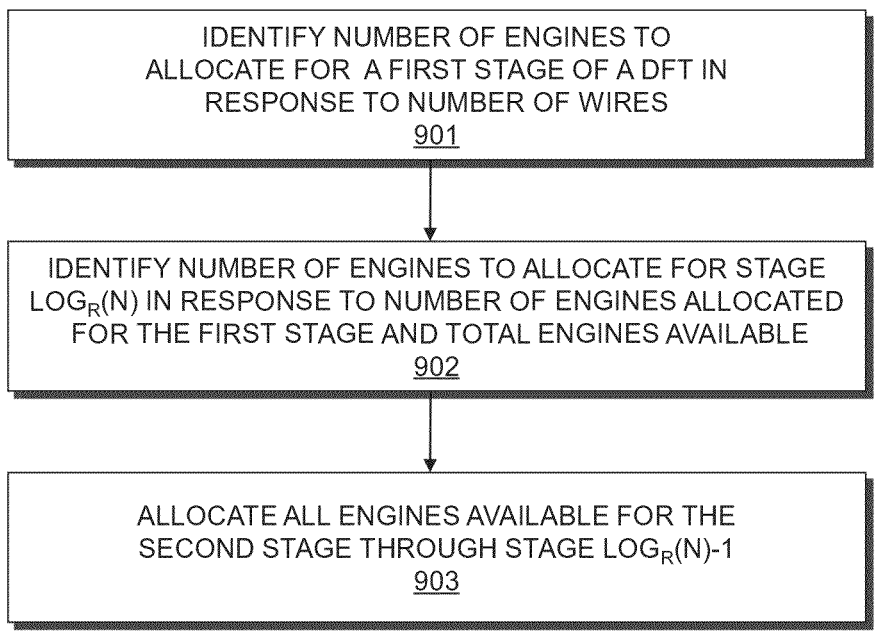
FIG. 9 is a flow chart illustrating a method for arranging DFT engines in a tessellated DFT unit according to an embodiment of the present invention.

FIG. 9 is a flow chart illustrating a method for arranging DFT engines in a tessellated DFT unit according to an embodiment of the present invention. At 901, a number of DFT engines to allocate for processing the logical butterflies of a first stage of the DFT is identified. According to an embodiment of the present invention, the number of DFT engines to allocate for processing the logical butterflies of the first stage of the DFT is determined based on the number of wires computed at procedure 404 of FIG. 4. In this example, since there are 6 physical wires inputting data into the DFT unit and since each of the DFT engines available are radix 4, at least 2 DFT engines are required for the first stage to perform 2 logical butterflies at each clock cycle. It should be appreciated that since each DFT engine is radix 4, data from 6 wires are buffered in and data for 8 wires are buffered out of the 2 DFT engines.

At 902, a number of DFT engines to allocate for stage $\log_R(N)$, the last stage of the DFT is identified. According to an embodiment of the present invention, the number of DFT engines to allocate for the last stage of the DFT is determined based on the number of engines allocated for first stage of the DFT (determined at 901) and the total engines available (determined at 403 of FIG. 4). In one embodiment, the number of DFT engines to allocate for the last stage of the DFT is the number of DFT engines unused for the first stage. In this example, since there are 4 total DFT engines available and 2 DFT engines have been allocated for the first stage, 2 DFT engines are allocated for stage 3, the last stage of the DFT. This allocation of engines allows the DFT engines to be used to perform logical butterfly operations for the first stage and the last stage of the DFT concurrently.

At 903, all engines available are allocated for the second stage of the DFT through the $\log_R(N)$ stage of the DFT.

As illustrated in FIG. 8A, 2 DFT engines are utilized to perform butterfly operations for a first stage of a DFT during clock cycles 1-8. During clock cycles 9-12, all 4 DFT engines are utilized to perform butterfly operations for a second stage of the DFT. During clock cycles 13-20, 2 DFT engines are utilized to perform butterfly operations for a third stage of the DFT. This allows the 2 other DFT engines to be used to perform butterfly operations for a first stage of another DFT. By utilizing only 4 DFT engines, the design satisfies the throughput of 533 mega samples/sec without utilizing more resources then are necessary. Without using this tessellation approach, a designer might build a horizontal DFT unit with 3 stages wide, and 2 rows high. This provides sufficient bandwidth to process the data, however, the pipeline is idle for some cycles since the throughput for the design would be too high. The 6 DFT engines used in this horizontal DFT unit would result in 50% of unused throughput. The tessellated DFT unit described satisfies the throughput requirement while efficiently utilizing resources of a target device.

The methodology for arranging DFT engines as described with reference to FIG. 9 complies with constraints where the order of operation is respected. The DFT engines are used at every clock cycle and the pattern tessellates with the next DFT calculation as illustrated in FIG. 8B. Starting calculations earlier using the DFT engines at clock cycle 1-8 preserves the use of memory and reduces latency.

Figure 10:
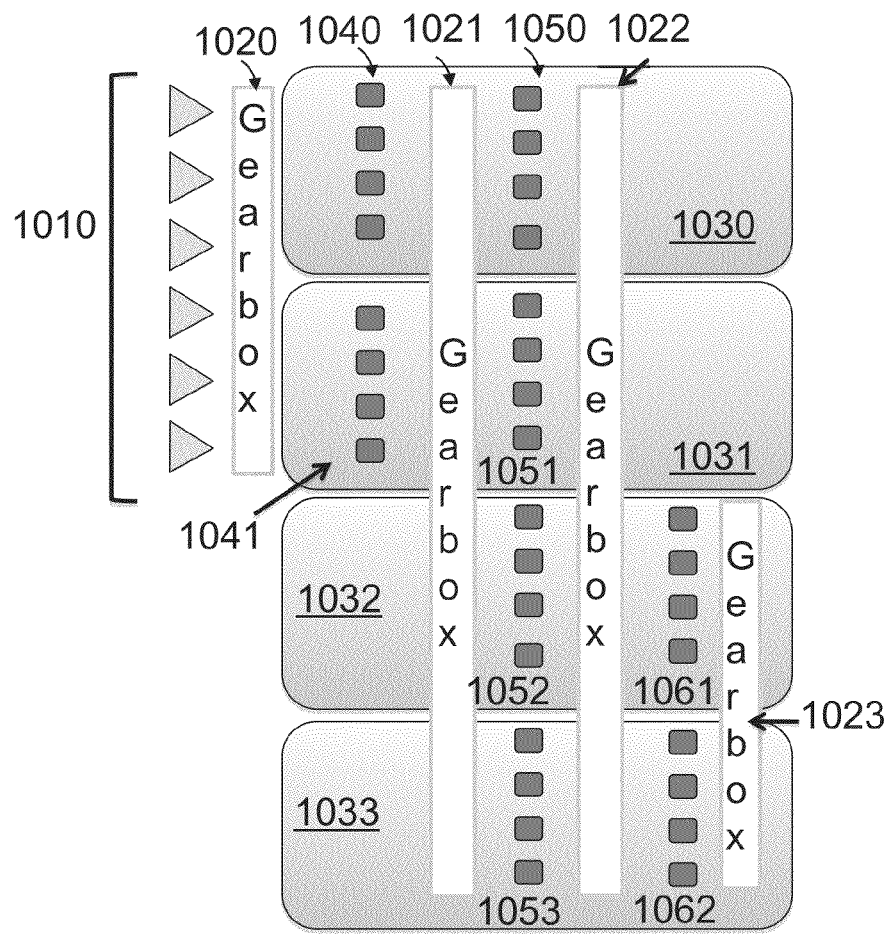
FIG. 10 illustrates a physical perspective of a portion of a tessellated DFT unit according to an embodiment of the present invention.

FIG. 10 illustrates a physical and logical perspective of a tessellated DFT unit 1000 according to an embodiment of the present invention. The tessellated DFT unit 1000 may be used to implement the tessellated DFT unit 800 illustrated in FIG. 8A. The tessellated DFT unit 1000 includes a plurality of input ports 1010. The plurality of input ports 1010 are coupled to 6 physical wires that transmit data to the tessellated DFT unit 1000. A first gearbox 1020 buffers and shuffles the data from the physical wires to a first DFT engine 1030 and a second DFT engine 1031. The first DFT engine 1030 and second DFT engine 1031 operate to implement the logical butterflies at the first stage of the DFT by performing butterfly operations during clock cycles 1-8. The first DFT engine 1030 and the second DFT engine 1031 are each radix 4. Therefore, the first DFT engine 1030 implements memory 1040 and the second DFT engine 1031 implements memory 1041 to store intermediate results during a first stage of the DFT. The results from the first DFT engine 1030 and the second DFT engine 1031 are output to a second gearbox 1021 which operates to buffer and shuffle the data to the first DFT engine 1030, second DFT engine 1031, third DFT engine 1032, and fourth DFT engine 1033.

The first DFT engine 1030, second DFT engine 1031, third DFT engine 1032, and fourth DFT engine 1033 operate to implement the logical butterflies at the second stage of the DFT by performing butterfly operations during clock cycles 9-12. The first, second, third, and fourth DFT engines 1030-1033 implement memories 1050-1053 to store intermediate results during the second stage of the DFT. The results from the first, second, third, and fourth DFT engines 1030-1033 are output to a third gearbox 1022 which operates to buffer and shuffle the data to the third DFT engine 1032 and fourth DFT engine 1033.

The third DFT engine 1032 and fourth DFT engine 1033 operate to implement the logical butterflies at the third stage of the DFT by performing butterfly operations during clock cycles 13-20. The third DFT engine 1032 implements memory 1060 and the fourth DFT engine 1033 implements memory 1061 to store intermediate results during a third stage of the DFT. The results from the third DFT engine 1032 and the fourth DFT engine 1033 are output to a fourth gearbox 1023 which operates to buffer and shuffle the data to the third DFT engine 1032 and fourth DFT engine 1033 to its destination.

Figure 11:
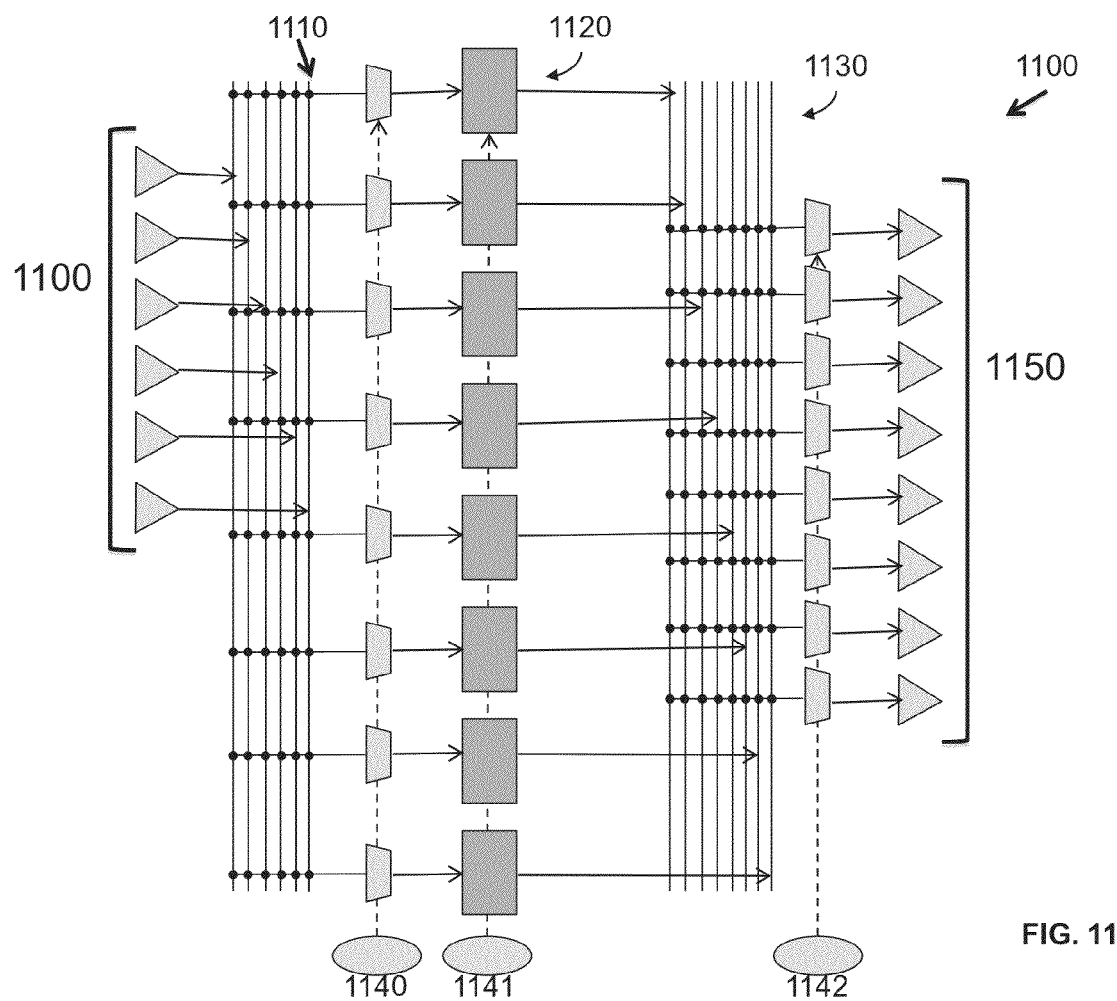
FIG. 11 illustrates an exemplary gearbox according to an embodiment of the present invention.

FIG. 11 illustrates an exemplary gearbox 1100 according to an embodiment of the present invention. The gearbox 1100 may be used to implement gearbox 1020 illustrated in FIG. 10. The gearbox includes a first routing network 1110 that includes a plurality of multiplexers that route data from 6 input ports to a plurality of memory units 1120. At an appropriate time, the memory units 1120 are transmitted to a second routing network 1130 that includes a plurality of multiplexers to 8 output ports 1150. The routing units 1110 and 1130 and memory units 1120 are controlled by state machines 1140-1142 which may be implemented by counters or other components.

According to an embodiment of the present invention, over the course of 12 clock cycles, the gearbox 1100 may receive 64 data inputs, store the inputs, and write the same 64 data inputs, reordered, over 8 clock cycles. In practice, not all of the multiplexers are fully populated.

According to embodiments of the present invention, a method and apparatus for performing requirement-driven discrete Fourier transforms are disclosed. A required performance point may be specified for a generator to design and build the hardware needed to implement a DFT unit to compute DFTs according to satisfy the performance point. DFT calculations are treated as a graph of butterfly calculations. The logical butterflies may be folded onto fewer physical butterflies to achieve resource savings. The physical butterflies may be implemented by DFT engines on a target device implemented by components such as adders, multipliers, multiplexers and/or other components. The DFT engines perform butterfly operations represented by the logical butterflies during each stage of a DFT.

Embodiments of the present invention described throughout the specification provide examples of a method and apparatus for performing requirement requirement-driven DFTs. It should be appreciated that the techniques and circuitry described may also be used to implement method and apparatus for performing requirement-driven inverse DFTs.

FIGS. 1, 3, and 4 are flow charts that illustrate embodiments of the present invention. The procedures described in these figures may be performed by an EDA tool implemented by a computer system. Some of the techniques illustrated may be performed sequentially, in parallel or in an order other than that which is described and that the procedures described may be repeated. It is appreciated that not all of the techniques described are required to be performed, that additional techniques may be added, and that some of the illustrated techniques may be substituted with other techniques.

Figure 12:
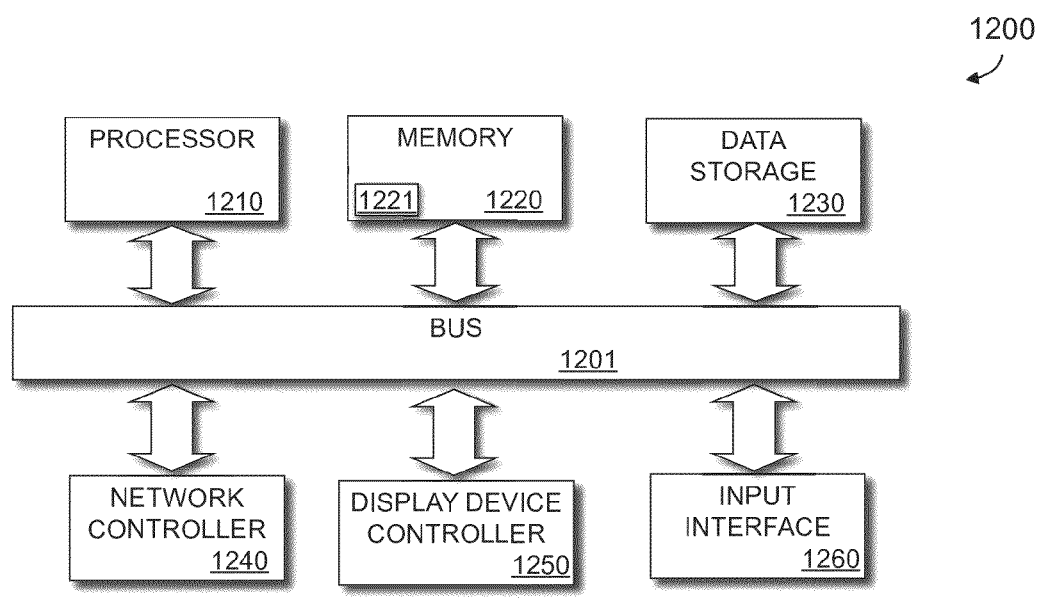
FIG. 12 illustrates a block diagram of a computer system implementing a system designer according to an embodiment of the present invention.

FIG. 12 is a block diagram of an exemplary computer system 1200 in which an example embodiment of the present invention resides. The computer system 1200 includes a processor 1210 that process data signals. The processor 1210 is coupled to a bus 1201 or other switch fabric that transmits data signals between processor 1210 and other components in the computer system 1200. The computer system 1200 includes a memory 1220. The memory 1220 may store instructions and code represented by data signals that may be executed by the processor 1210. A data storage device 1230 is also coupled to the bus 1201.

A network controller 1240 is coupled to the bus 1201. The network controller 1240 may link the computer system 1200 to a network of computers (not shown) and supports communication among the machines. A display device controller 1250 is coupled to the bus 1201. The display device controller 1250 allows coupling of a display device (not shown) to the computer system 1200 and acts as an interface between the display device and the computer system 1200. An input interface 1260 is coupled to the bus 1201. The input interface 1260 allows coupling of an input device to the computer system 1201 and transmits data signals from an input device to the computer system 1200. It should be appreciated that computer systems having a different architecture may also be used to implement the computer system 1200.

A system designer 1221 may reside in memory 1220 and be executed by the processor 1200. The system designer 1221 may operate to perform design capture and generate a design for a DFT unit, synthesize a system, place the system on a target device, route the system on the target device, perform timing analysis, and assemble the system.

Figure 13:
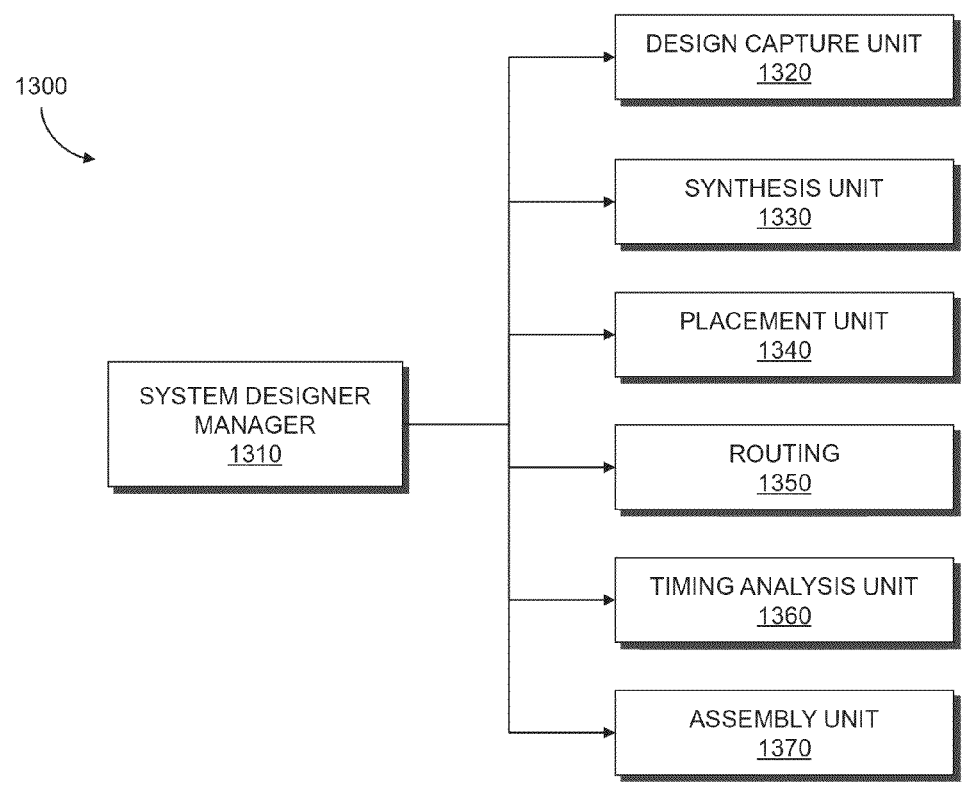
FIG. 13 is a block diagram of a system designer according to an embodiment of the present invention.

FIG. 13 illustrates a system designer 1300 according to an embodiment of the present invention. The system designer 1300 may be an EDA tool for designing a system on a target device such as an FPGA, structured application-specific integrated circuit (ASIC), ASIC, or other circuitry. FIG. 13 illustrates modules implementing an embodiment of the system designer 1300. According to one embodiment, the modules represent software modules and system design may be performed by a computer system such as the one illustrated in FIG. 12 executing sequences of instructions represented by the modules shown in FIG. 13. Execution of the sequences of instructions causes the computer system to support system design as will be described hereafter. In alternate embodiments, hard-wire circuitry may be used in place of or in combination with software instructions to implement embodiments of the present invention. Thus, embodiments of the present invention are not limited to any specific combination of hardware circuitry and software.

The system designer 1300 includes a designer manager 1310. The designer manager 1310 is connected to and transmits data between the components of the system designer 1300.

The system designer 1300 includes a design capture unit 1320. According to an embodiment of the present invention, a hardware description language (HDL) design definition is generated to describe the system. The HDL is generated in response to specifications of the system provided by a designer. The specifications may describe components and interconnections in the system. According to an embodiment of the present invention, a design for a discrete Fourier transform (DFT) unit is generated by the design capture unit 1320. The design is generated using desired throughput (sample rate) as a parameter to accurately build a streaming DFT unit. The DFT unit is designed with the objective of not overusing resources to achieve the desired throughput. The design capture unit 1320 may implement the procedures described with reference to FIGS. 3, 4, and 9 to generate the DFT units described with reference to FIGS. 5-8B.

The system designer 1300 includes a synthesis unit 1320 that performs synthesis. The synthesis unit 1320 generates a logic design of a system to be implemented on the target device. According to an embodiment of the system designer 1300, the synthesis unit 1320 takes a conceptual HDL design definition and generates an optimized logical representation of the system. The optimized logical representation of the system generated by the synthesis unit 1310 may include a representation that has a reduced number of functional blocks and registers, such as logic gates and logic elements, required for the system. Alternatively, the optimized logical representation of the system generated by the synthesis unit 1320 may include a representation that has a reduced depth of logic and that generates a lower signal propagation delay.

The synthesis unit 1320 also performs technology mapping. Technology mapping involves determining how to implement the functional blocks and registers in the optimized logic representation utilizing specific resources such as cells on a target device thus creating an optimized "technology-mapped" netlist. The technology-mapped netlist illustrates how the resources (cells) on the target device are utilized to implement the system. In an embodiment where the target device is an FPGA, the technology-mapped netlist may include cells such as logic array blocks (LABs), registers, memory blocks, digital signal processing (DSP) blocks, input output (JO) elements or other components.

The system designer 1300 includes a placement unit 1330 that processes the optimized technology-mapped netlist to produce a placement for each of the functional blocks. The placement identifies which components or areas on the target device are to be used for specific functional blocks and registers.

The system designer 1300 includes a routing unit 1340 that performs routing. The routing unit 1340 determines the routing resources on the target device to use to provide interconnection between the components implementing functional blocks and registers of the logic design.

The system designer 1300 includes a timing analysis unit 1350 that performs timing analysis to determine whether timing constraints of the system are satisfied.

The system designer 1300 includes an assembly unit 1360 that performs an assembly procedure that creates a data file that includes the design of the system generated by the system designer 1300. The data file may be a bit stream that may be used to program the target device. The assembly unit 1360 may output the data file so that the data file may be stored or alternatively transmitted to a separate machine used to program the target device. It should be appreciated that the assembly unit 1360 may also output the design of the system in other forms such as on a display device or other medium.

It should be appreciated that embodiments of the present invention may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 14:
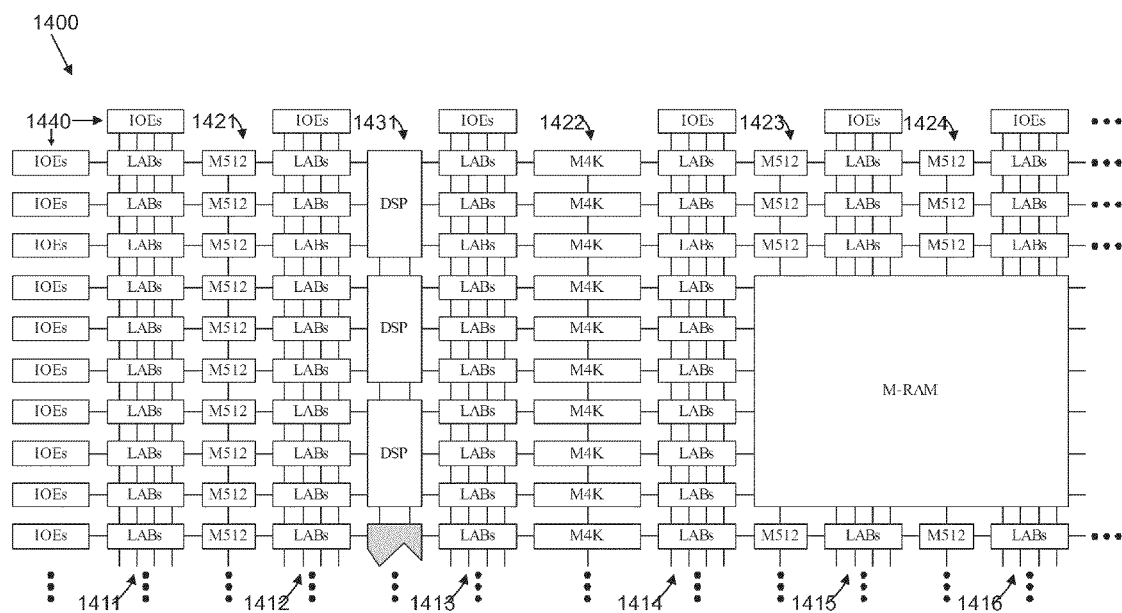
FIG. 14 illustrates an exemplary target device according to an embodiment of the present invention.

FIG. 14 illustrates a device 1400 that may be used to implement a target device according to an embodiment of the present invention. The device 1400 is a field programmable gate array (FPGA) that includes a plurality of logic-array blocks (LABs). Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input LUT with a configurable register. According to an alternate embodiment of the present invention, the logic block may operate similarly to an adaptive logic module (ALM), such as those found in Stratix devices manufactured by Altera Corporation. LABs are grouped into rows and columns across the device 1400. Columns of LABs are shown as 1411-1416. It should be appreciated that the logic block may include additional or alternate components.

The device 1400 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 1400. Columns of memory blocks are shown as 1421-1424.

The device 1400 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 1400 and are shown as 1431.

The device 1400 includes a plurality of input/output elements (IOEs) 1440. Each IOE feeds an IO pin (not shown) on the device 1400. The IOEs 1440 are located at the end of LAB rows and columns around the periphery of the device 1400. Each IOE may include a bidirectional IO buffer and a plurality of registers for registering input, output, and output-enable signals.

The device 1400 may include routing resources such as LAB local interconnect lines, row interconnect lines ("H-type wires"), and column interconnect lines ("V-type wires") (not shown) to route signals between components on the target device.

In the foregoing specification, embodiments of the invention have been described with reference to specific exemplary embodiments thereof. It will, however, be evident that various modifications and changes may be made thereto without departing from the broader spirit and scope of the embodiments of the invention. For example, path delays were described as being identified from delay per element functions generated from voltage functions of signals. It should be appreciated that other delay-impacting parameter functions may be used in place of or in addition to voltage functions. Other delay-impacting parameters may include temperature, and other parameters. The specification and drawings are, accordingly, to be regarded in an illustrative rather than restrictive sense.

What is claimed is:

1. A method for designing a discrete Fourier transform (DFT) unit in a system on a target device, comprising:
   identifying a number of DFT engines to implement in the DFT unit in response to a data throughput rate, a clock rate of the system, a size of a DFT, and radix of each of the DFT engines, wherein the identifying is performed by a processor.

2. The method of claim 1, further comprising building a flat DFT unit utilizing identified DFT engines, wherein each logical butterfly is implemented by a dedicated DFT engine.

3. The method of claim 2, wherein building the flat DFT unit is performed in response to determining that the data throughput rate is equal to the clock rate of the system multiplied by the size of the DFT.

4. The method of claim 1, further comprising building a super sampled DFT unit utilizing identified DFT engines, wherein each logical butterfly is implemented by more than one dedicated DFT engine.

5. The method of claim 4, wherein building the super sampled DFT unit is performed in response to determining that the data throughput rate is greater than the clock rate of the system multiplied by the size of a DFT.

6. The method of claim 1, further comprising building a horizontally folded DFT unit, wherein a single DFT engine is used to implement more than one logical butterfly.

7. The method of claim 6, wherein building the folded DFT unit is performed in response to determining that the data throughput rate is equal to the clock rate of the system multiplied by the radix of each of the DFT engines.

8. The method of claim 1, further comprising building a regular folded DFT unit, wherein a single DFT engine is used to implement more than one logical butterfly and more than one DFT engine is used in each stage of the DFT.

9. The method of claim 1, wherein building the regular folded DFT unit is performed in response to determining that the data throughput rate divided by a product of the clock rate of the system and the radix of each of the DFT engines is an integer.

10. The method of claim 1, further comprising building a tessellated DFT unit, wherein during a point of time of operation, DFT engines may be used to perform computations at different stages of a DFT.

11. The method of claim 10, wherein building the tessellated DFT unit is performed in response to determining that the data throughput rate divided by a product of the clock rate of the system and the radix of each of the DFT engines is not an integer.

12. The method of claim 11, wherein during a point of time of operation, DFT engines in the tessellated DFT unit may be used to perform computations at different stages of a DFT.

13. The method of claim 11, further comprising determining a number of DFT engines to implement by identifying a numbe5r of stages in the DFT from the size of the DFT and the radix of each DFT engine, and identifying a number of DFT engines per stage from the desired data throughput rate, the clock rate of the system, and the radix of each of the DFT engines.

14. The method of claim 11, further comprising identifying a number of physical wires to input into the DFT unit from the desired data throughput rate and the clock rate of the system.

15. The method of claim 11, wherein building the tessellated DFT unit comprises:
   identifying a number of DFT engines to allocate for processing data in a first stage of the DFT in response to a number of physical wires input into the DFT unit;
   identifying a number of DFT engines to allocate for processing data in a last stage of the DFT in response to the number of DFT engines allocated for processing data in the first stage and a total number of engines available; and
   allocating the total number of engines available for processing data for stages between the first stage and the last stage.

16. The method of claim 10, wherein building the tessellated DFT unit comprises:
   identifying a number of DFT engines to allocate for processing data in a first stage of the DFT in response to a number of physical wires input into the DFT unit;
   identifying a number of DFT engines to allocate for processing data in a last stage of the DFT in response to the number of DFT engines allocated for processing data in the first stage and a total number of engines available; and
   allocating the total number of engines available for processing data for stages between the first stage and the last stage.

17. The method of claim 1, wherein determining the number of DFT engines to implement comprises:
   identifying a number of stages in the DFT from the size of the DFT, and the radix of each of the DFT engines; and
   identifying a number of DFT engines per stage from the desired data throughput rate, the clock rate of the system, and the radix of each of the DFT engines.

18. The method of claim 1, further comprising identifying a number of physical wires to input into the DFT unit from the desired data throughput rate and the clock rate of the system.

19. A non-transitory computer readable medium including a sequence of instructions stored thereon for causing a computer to execute a method comprising:
   identifying a number of DFT engines to implement in a discrete Fourier transform (DFT) unit in response to a data throughput rate, a clock rate of a system, a size of a DFT, and radix of each of the DFT engines.

20. The non-transitory computer readable medium of claim 19, wherein the method further comprises building a flat DFT unit in response to determining that the data throughput rate is equal to the clock rate of the system multiplied by the size of the DFT, wherein each logical butterfly is implemented by a dedicated DFT engine.

21. The non-transitory computer readable medium of claim 19, wherein the method further comprises building a super sampled DFT unit in response to determining that the data throughput rate is greater than the clock rate of the system multiplied by the size of a DFT, wherein each logical butterfly is implemented by more than one dedicated DFT engine.

22. The non-transitory computer readable medium of claim 19, wherein the method further comprises building a horizontally folded DFT unit in response to determining that the data throughput rate is equal to the clock rate of the system multiplied by the radix of each of the DFT engines, wherein a single DFT engine is used to implement more than one logical butterfly.

23. The non-transitory computer readable medium of claim 19, wherein the method further comprises building a regular folded DFT unit in response to determining that the data throughput rate divided by a product of the clock rate of the system and the radix of each of the DFT engines is an integer, wherein a single DFT engine is used to implement more than one logical butterfly and more than one DFT engine is used in each stage of the DFT.

24. The non-transitory computer readable medium of claim 19, wherein the method further comprises building a tessellated DFT unit in response to determining that the data throughput rate divided by a product of the clock rate of the system and the radix of each of the DFT engines is not an integer, wherein during a point of time of operation, DFT engines may be used to perform computations at different stages of a DFT.

25. The non-transitory computer readable medium of claim 24, wherein building the tessellated DFT unit comprises:
    identifying a number of DFT engines to allocate for processing data in a first stage of the DFT in response to a number of physical wires input into the DFT unit;
    identifying a number of DFT engines to allocate for processing data in a last stage of the DFT in response to the number of DFT engines allocated for processing data in the first stage and a total number of engines available; and
    allocating the total number of engines available for processing data for stages between the first stage and the last stage.

26. The non-transitory computer readable medium of claim 24, wherein the method further comprises determining a number of DFT engines to implement by identifying a numbe5r of stages in the DFT from the size of the DFT and the radix of each DFT engine, and identifying a number of DFT engines per stage from the desired data throughput rate, the clock rate of the system, and the radix of each of the DFT engines.

27. The non-transitory computer readable medium of claim 19, wherein determining the number of DFT engines to implement comprises:
    identifying a number of stages in the DFT from the size of the DFT, and the radix of each of the DFT engines; and
    identifying a number of DFT engines per stage from the desired data throughput rate, the clock rate of the system, and the radix of each of the DFT engines.

* * * * *